June 14, 1927.
G. V. MILLAR
MILK COOLER
Filed June 7, 1924
1,632,494
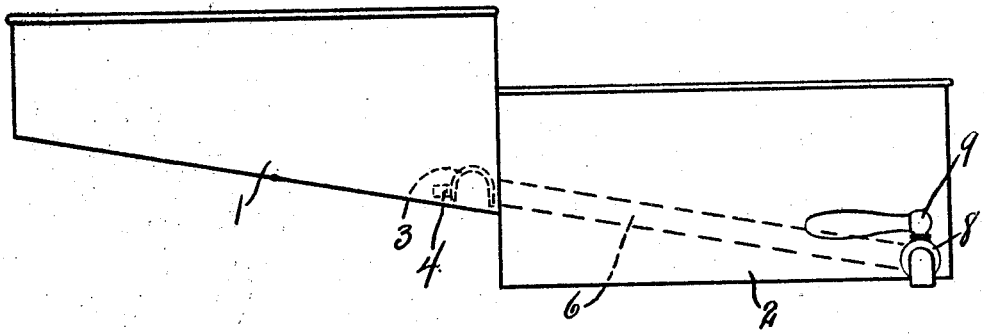
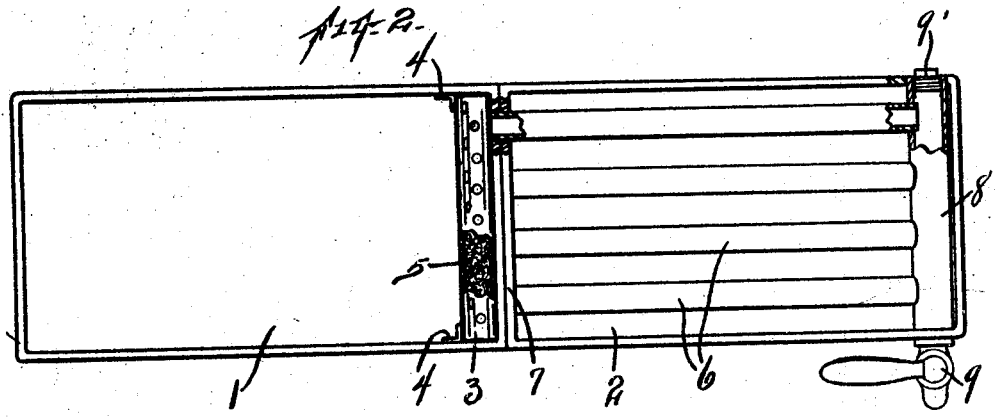
Inventor
GARRETT V. MILLAR
By A. L. Jackson
Attorney Patented June 14, 1927.

1,632,494

UNITED STATES PATENT OFFICE.

GARRETT V. MILLAR, OF FORT WORTH, TEXAS.

MILK COOLER.

Application filed June 7, 1924. Serial No. 718,679.

My invention relates to milk coolers and more particularly to milk coolers for cooling fresh milk, that is, milk immediately after it is milked from the cows; and the object is to provide a simple and efficient means of bringing the fresh milked milk to the temperature required by the food and sanitary laws of different States and which can be furnished at small cost and which can be operated at very small cost. Other objects and advantages will be fully explained in the following description and the invention will be more particularly pointed out in the claims.

Reference is had to the accompanying drawings which form a part of this application.

Fig. 1 is a side elevation of the milk cooler. Fig. 2 is a plan view, partly broken.

The improved cooler has two compartments,—a straining compartment 1 and a cooling compartment 2 fixedly connected together in any suitable manner. The compartments may be made of sheet metal or other material. Compartment 1 is provided with a strainer 3 which consists of a sheet metal hood of inverted trough like shape which is perforated for the passage of the milk. This strainer 3 is placed on the bottom of compartment 1 and held in place therein by brackets 4. The strainer is provided with cotton or some fibrous material 5 through which the milk may pass or trickle into the cooling pipes 6 which project through the partition wall 7. The cooling pipes 6 are open ended pipes and they receive the milk from the tank 1 and discharge the milk into a discharge pipe 8 which projects entirely through the lower part of the compartment 2. The pipe is provided with a removable plug 9′ which may be removed for cleaning the discharge pipe 8. The pipe 8 is provided with cock 9 which may be opened or closed, as may be required. The cooling pipes 6 project into the pipe 8 for discharging the milk into pipe 8. The milk is drawn from the pipe 8 in any suitable manner. The cooling pipes 6 are placed at an incline, as shown in Fig. 1. The milk will readily flow down the pipes 6 into the discharge pipe 8.

The pipes 6 are covered with ice and salt to any required depth. The milk is poured into the compartment immediately after it is milked. The requirements are that the temperature of the milk must be reduced to a certain degree in a short time to prevent development of bacilli. In the devices shown, the milk is strained and cooled. The straining material 5 may be changed or cleaned as often as may be required. Use of the devices in actual service demonstrate that these devices are highly efficient for the purposes set forth.

The strainer compartment should be at a higher elevation than the cooling compartment and be provided with an inclined bottom. The partition 7 is perforated to receive the ends of the cooling pipes 6.

What I claim, is,—

1. A milk cooler comprising a strainer compartment for storing the milk to be strained provided with an inclined bottom, a cooling compartment for containing cooling elements, a strainer in said strainer compartment adjacent to said cooling compartment, inclined pipes in said cooling compartment and connected to said strainer, and a discharge pipe in said cooling compartment and connected to all of said inclined pipes and projecting out of said cooling compartment.

2. A milk cooler comprising a strainer compartment for storing the milk to be strained provided with a relatively long inclined bottom, a strainer at the lowest point of said strainer compartment, a cooling compartment adjacent to said strainer for containing cooling elements, the walls of said strainer compartment and cooling compartment being perforated, relatively long inclined cooling pipes projected through said perforations and communicating with said strainer, and a discharge pipe connected to all of said inclined pipes and projected out of said cooling compartment.

In testimony whereof, I set my hand this 1st day of August, 1923.

GARRETT V. MILLAR.